Jan. 16, 1962 W. E. LINDSTROM 3,017,190
VALVE STEM SEAL
Filed Sept. 30, 1957
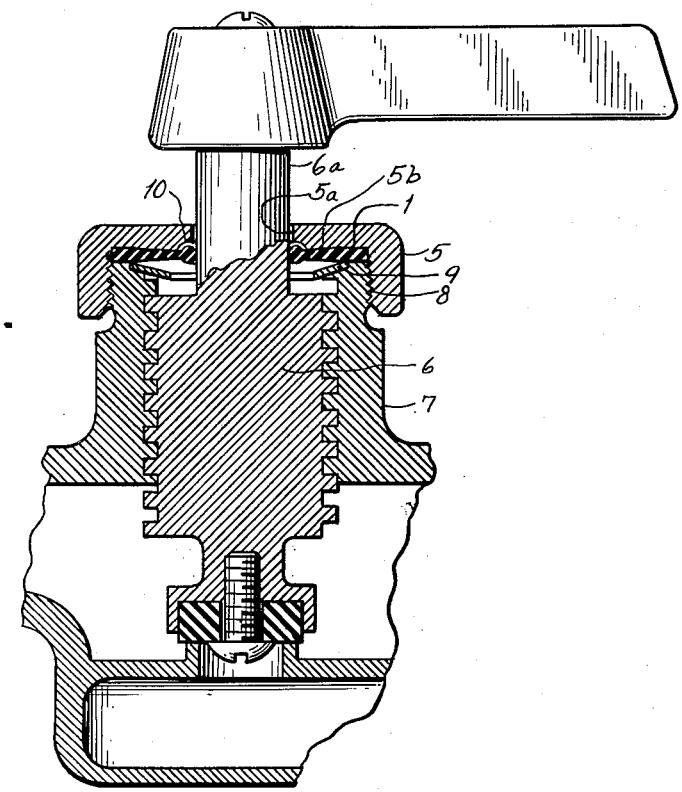
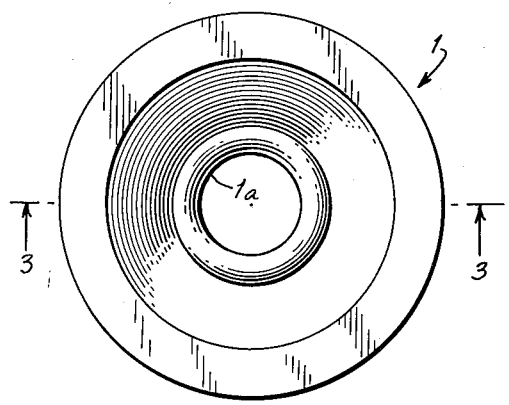
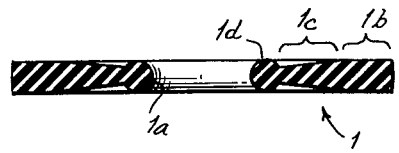
INVENTOR.
WILFRED E. LINDSTROM
BY
*Lester W. Clark*
ATTORNEY United States Patent Office 3,017,190
Patented Jan. 16, 1962

3,017,190
VALVE STEM SEAL
Wilfred E. Lindstrom, Oradell, N.J., assignor to Lindstrom & King Company, Passaic, N.J., a corporation of New Jersey
Filed Sept. 30, 1957, Ser. No. 687,203
7 Claims. (Cl. 277—32)

This invention relates to sealing apparatus for preventing the leakage of fluid between two relatively movable parts. For example, such apparatus is herein illustrated as used in a valve or faucet, to prevent leakage around the operating stem, or spindle. While the invention is of particular utility in connection with such a valve or faucet, it also has broader utility in connection with other sealing problems.

The invention is illustrated herein as used around the operating stem of a common type of water faucet, also known as a bibb or cock, in which a cap nut is used both to retain the packing, or sealing element, and to close the opening into the interior of the faucet body through which the operating stem has been inserted during manufacture. In this type of construction, it is necessary to prevent the leakage of water from around the operating stem, and also to prevent leakage from between the cap nut and the body of the faucet. In existing practice, this is accomplished either by use of separate sealing, or packing elements, or by use of a single packing element to seal both areas of possible leakage.

An object of this invention is to provide an improved seal for preventing liquid leakage between two relatively moving parts. A further object is to provide such a seal in which the relative movement may be rotary or sliding, or both.

Another object of this invention is to provide a seal for preventing leakage from around the operating stem of a faucet of the type described, which will produce far less frictional resistance to motion of the stem than is produced by the conventional packing, now in general use. A further object is to provide an improved single element seal of the type described which will also serve to prevent leakage from between the cap nut and the faucet body.

A further object is to provide a seal of the type described which does not require high standards of quality in the manufacture of the stem and faucet body; that is, a seal which will function satisfactorily in faucets manufactured to the rather loose dimensional tolerances, and rather poor standards of surface finishes, which are currently used in the plumbing brass goods industry.

A further object is to provide a seal of the type described which will continue to seal when the stem is displaced slightly laterally, as may occur in operation due to force on the operating handle or due to the eccentricity between the upper portion of the stem and its threaded portion; and which will seal against leakage even though the upper portion of the stem may be slightly tapered or elliptical.

Still a further object is to provide a seal of the type described which can be assembled easily and rapidly with related parts during manufacture, and which will not be damaged readily during handling and assembly.

In the drawing:

FIGURE 1 is a fragmentary cross-sectional view, taken in a plane through the axis of the operating stem, showing a portion of a typical faucet body assembly, including a seal constructed in accordance with the invention;

FIGURE 2 is a plan view of the seal ring of FIG. 1; and

FIGURE 3 is a diametrical cross-sectional view of the seal ring of FIGS. 1 and 2.

Referring to FIG. 1, there is shown a valve body 7 in which is threaded a valve stem 6. Only a portion of the stem 6 is threaded. Above the threaded portion, a portion 6a of smaller diameter projects outwardly of the body 7. A cap nut 5 is threaded on the outside of the upper end of the housing 7 and is provided at its center with an aperture 5a having a diameter large enough to receive the stem portion 6a with substantial clearance.

A seal ring 1 is located between the upper end of the housing 7 and the cap nut 5. The seal ring 1 is the principal novel element of the present invention, and is shown in detail in FIGS. 2 and 3.

Referring to FIGS. 2 and 3, there is shown a seal ring 1 of generally annular form having a circular hole 1a through its center. As best seen in FIG. 3, the seal ring 1 has an outer peripheral portion 1b of substantial thickness connected by an intermediate web portion 1c to an inner toroidal portion or bead 1d, which is located adjacent the central hole 1a.

The outside diameter of the ring 1 is selected so that the ring fits with slight clearance into the inside of the cap nut 5. The hole 1a is dimensioned so that when the ring 1 is unstressed, the ring slides freely over the valve stem portion 6a. The seal ring 1 may be of any flexible material such as the softer compounds of natural or synthetic rubber, or the softer grades of polyethylene or other plastic materials.

The peripheral portion 1b is of substantial thickness, so that when the seal ring is installed in a valve as shown in FIG. 1, and the cap nut 5 is tightened onto the valve body 7, the peripheral portion is compressed between the cap nut and the valve body and forms a fluid tight seal which prevents leakage through the threaded connection between the cap nut and the valve body. Under present manufacturing conditions and tolerances, which are designed for mass production, the top surface of the valve body is fairly rough and irregular. The peripheral portion of the seal ring 1 must be thick enough to adapt itself to these irregularities and prevent leakage past them. Furthermore, since the material of the seal is relatively incompressible, in the sense that its total volume is not substantially reduced by compression, the tightening of the cap nut will cause the seal material to flow elastically, both outwardly to improve the seal against leakage past the threads, and inwardly, thereby forcing the web portion of the bead of the seal toward the valve stem 6a and holding the bead in tight sealing engagement with the stem.

It is preferred to make the peripheral portion 1b thick enough to provide sufficient material to flow outwardly and fill the final threads in the interior of the cap nut 5, thereby perfecting the seal between the cap nut and the valve body. If the thickness of the peripheral portion of the ring is so selected, then it will also provide sufficient material for elastic flow inwardly to compress the bead against the valve stem, producing a fluid tight seal there even though the stem diameter may be somewhat smaller than the unstressed diameter of the hole in the seal ring.

The web portion 1c of the seal ring is preferably made with a tapering cross-section, as shown in FIG. 3. This web portion transmits the radial inward force from the flange portion, and also permits the bead to move slightly in any radial direction. The flexibility afforded by the relatively thin cross-section of the tapered web is of particular importance when the seal ring is used in a water faucet, as shown. Under current manufacturing practice, the threads on the stem 6 have a loose fit with the threads on the inside of the valve body 7. Furthermore, as the faucet wears in use, the looseness of the fit increases. Consequently, the stem portion 6a has a certain amount of freedom of motion in any radial direction. Furthermore, surface irregularities in the threads on the stem and the body may tend to move the stem away from its normal position concentric with the axis of the valve body. The same effect may be produced in operation by a force applied to the valve handle. Furthermore, due to manufacturing errors and tolerances, the axis of the threaded portion of the valve stem may not be exactly concentric with the axis of the cylindrical portion 6a on which the seal ring 1 bears, so that the cylindrical portion will move eccentrically when the stem is rotated. In some cases, this cylindrical portion 6a may not be truly cylindrical—it may be either elliptical or slightly tapered.

The flexibility afforded by the thin web portion 1c of the seal allows the bead 1d, as a unit, to follow any reasonable amount of lateral motion of the stem while maintaining sealing contact all around the stem. It also allows the bead to accommodate itself to taper or out-of-roundness in the stem.

According to a feature of this invention, the bead which bears against the valve stem has a generally circular cross-section, rather than a lip, such as is found in many conventional seal rings. The circular bead is less easily damaged during shipment and handling than the conventional lip arrangement. Furthermore, either side of the seal may be assembled toward the interior of the valve and a lead-on tool is not required when inserting the stem through the seal to prevent damage to the sealing surface. The rounded surface of the bead combined with the fact that the seal need not be a tight fit on the stem, allows the seal ring and the stem to be readily assembled with little possibility of damage to the seal. Furthermore, since the bead is thicker than the web, it does act as a lip to the extent that fluid pressure inside the valve body tends to force the bead against the stem, thereby producing a sealing force proportional to the pressure across the seal ring.

There is shown in FIG. 1 a washer 9 located under the seal and having its periphery received in a recess formed in the top of the valve body. This washer may be of brass or other conventional washer materials, such as various types of fiber. This washer acts as a stop limiting the upward travel of the valve stem, preventing possible damage to the seal which might occur if the shoulder at the top of the threaded portion of the stem were allowed to contact the seal. The washer may be slightly dished downwardly as shown in FIG. 1, or it may be flat, provided its center hole is sufficiently large to prevent its bearing against the bead portion of the seal, since the bead must be free to accommodate itself to irregularities of stem contour and movement.

The cap nut 5 shown in the drawing differs from the conventional cap nut in that it does not have an internal dome or bevel as is required for containing and compressing conventional packing materials. The height of the cap nut can be much less and the cylindrical portion 6a of the stem can be much shorter than in conventional packed valves.

The interior surface of the cap nut should be beveled slightly inwardly and downwardly as shown at 5b in FIG. 1. The bevel serves two purposes. It increases the compressive force on the flange portion of the seal, thus increasing the elastic flow of the seal toward the stem. It also causes the web and bead portions to be dished inwardly and downwardly against the pressure of fluid within the valve; so that the pressure will assist in forcing the bead against the stem. A central recess 10 is provided around the hole in the cap nut to accommodate the bead on the seal ring. The outside diameter of this recess should be slightly larger than that of the bead so that the latter is free to move radially under all conditions for the purposes previously explained.

While I have shown and described a preferred embodiment of my invention, other modifications thereof will readily occur to those skilled in the art, and I therefore intend my invention to be limited only by the appended claims.

I claim:
1. A seal ring of elastically deformable material, symmetrical with respect to a median plane perpendicular to the axis of the ring and having a central opening adapted to receive a shaft, said seal ring comprising an outer peripheral portion of substantial thickness and having plane surfaces on its opposite sides, an inner bead defining the opening and of circular cross-section, and a web portion integrally connecting the peripheral portion and the bead, said web portion having a thickness at its connection to the peripheral portion substantially equal to the thickness of that peripheral portion and tapering from said connection to a thickness substantially thinner than the peripheral portion and also thinner than the bead at its connection to the bead, said peripheral portion being effective when compressed in a direction parallel to the axis by opposed forces acting generally perpendicular to said plane surfaces to expand radially and force the web portion and the bead radially inwardly, thereby tending to decrease the diameter of the opening.

2. Sealing apparatus, comprising a rotatable shaft, a wall having an aperture through which the shaft passes freely, a seal ring coaxial with the shaft and of elastically deformable material, said ring being symmetrical with respect to a median plane perpendicular to the axis of the ring and shaft and having a central opening adapted to receive the shaft, said seal ring comprising an outer peripheral portion of substantial thickness and having plane surfaces on its opposite sides, an inner bead defining the central opening and of generally circular cross-section, and a web portion integrally connecting the peripheral portion and the bead, said web portion having a thickness at its connection to the peripheral portion substantially equal to the thickness of that peripheral portion and tapering from said connection to a thickness substantially thinner than the peripheral portion and also thinner than the bead at its connection to the bead, said peripheral portion being effective when compressed by opposed forces acting generally perpendicular to said plane surfaces to expand radially and force the web portion and the bead radially inwardly, thereby tending to decrease the diameter of the opening, means on said wall for receiving and compressing said peripheral portion, said receiving and compressing means comprising two cooperating threaded elements having opposing surfaces movable toward each other by threading said elements together, said peripheral portion being receivable between said opposing surfaces and effective when compressed thereby to expand elastically and force said web portion and said bead radially inwardly so that a curved surface of said bead sealingly engages the periphery of said shaft.

3. Sealing apparatus as defined in claim 2, in which the seal ring is subjected to a difference between the fluid pressures acting on its opposite sides, and the one of said threaded elements on the low pressure side of the seal ring has a flange overlying the web portion, said flange having a surface opposite the web portion beveled so that its innermost edge is nearer the median plane than the outermost edge, said beveled surface being effective to guide radial movements of the web portion due to compression of the peripheral portion, said flange also having a recess opposite and of larger dimensions than the bead, so that the bead and the adjacent web portion have substantial freedom of movement within the recess.

4. A packing assembly, comprising a body having an internally threaded aperture opening from a surface of the body, a shaft having an externally threaded portion and an unthreaded portion of smaller diameter than the externally threaded portion, the threaded portion of said shaft being received in said threaded aperture and cooperating therewith to form a threaded joint, said unthreaded portion extending from the threaded portion outwardly of the body, means for rotating the shaft and cooperating with the threaded joint to move the shaft inwardly and outwardly of the body, a seal ring coaxial with the shaft and of elastically deformable material, said ring being symmetrical with respect to a median plane perpendicular to the axis of the ring, and having a central opening large enough when said ring is unstressed to receive the unthreaded portion of the shaft, said seal ring comprising an outer peripheral portion of substantial thickness, an inner bead defining said opening and of generally circular cross-section, and a web portion thinner than said peripheral portion and thinner than the bead and integrally connecting said peripheral portion and said bead, a cap nut threadedly mounted on the body by cooperating threads located closely adjacent the periphery of the seal ring and having a flange opposed to said surface of the body, said cap nut encircling said shaft with substantial clearance, said seal ring having its peripheral portion received and compressed between said flange and said body, said peripheral portion being effective when compressed to expand elastically and force said web portion and said bead radially inwardly so that said bead sealingly and slidably engages the periphery of said unthreaded portion of the shaft, and also to expand elastically outward and seal the space between the threads on the cap nut and body, said web portion being aligned with the threaded portion of the shaft, and a washer between said seal ring and said body and between the threaded joint and the web portion of the seal ring, said washer being effective to prevent engagement of the seal ring by the threaded portion of the shaft as the shaft moves outwardly of the body, said seal ring and washer being removable after removal of the cap nut, so that the shaft may then be disassembled from the body.

5. Sealing apparatus as defined in claim 4, in which the washer is resiliently and conically shaped, with its central edge extending toward the shaft, so that it resiliently opposes further outward movement of the shaft after the latter engages the washer.

6. A seal ring in accordance with claim 1 wherein the plane surfaces of said outer peripheral portion are parallel to said median plane.

7. A sealing apparatus in accordance with claim 2 wherein said plane surfaces of said outer peripheral portion of said seal ring are parallel to said median plane.

References Cited in the file of this patent

UNITED STATES PATENTS

| | | |
|---|---|---|
| 2,368,744 | Carey | Feb. 6, 1945 |
| 2,397,486 | Hoertz | Apr. 2, 1946 |
| 2,401,377 | Smith | June 4, 1946 |
| 2,599,767 | Long | June 10, 1952 |
| 2,721,749 | Crow | Oct. 25, 1955 |
| 2,761,710 | Rudner | Sept. 4, 1956 |
| 2,764,324 | Landreth | Sept. 25, 1956 |
| 2,770,510 | Collins | Nov. 13, 1956 |
| 2,797,938 | Reynolds | July 2, 1957 |

FOREIGN PATENTS

| | | |
|---|---|---|
| 480,524 | Great Britain | Feb. 23, 1938 |
| 1,078,356 | France | Nov. 17, 1954 |